United States Patent
Bothe et al.

(10) Patent No.: US 10,592,133 B1
(45) Date of Patent: Mar. 17, 2020

(54) MANAGING RAW DEVICE MAPPING DURING DISASTER RECOVERY

(71) Applicant: Veritas Technologies LLC, Mountain View, CA (US)

(72) Inventors: Sujay Bothe, Ahmadnagar (IN); Aditya Deshpande, Pune (IN)

(73) Assignee: VERITAS TECHNOLOGIES LLC, Santa Clara, CA (US)

( * ) Notice: Subject to any disclaimer, the term of this patent is extended or adjusted under 35 U.S.C. 154(b) by 236 days.

(21) Appl. No.: 15/856,216

(22) Filed: Dec. 28, 2017

(51) Int. Cl.
*G06F 9/46* (2006.01)
*G06F 3/06* (2006.01)
*G06F 9/455* (2018.01)

(52) U.S. Cl.
CPC ............ *G06F 3/0619* (2013.01); *G06F 3/065* (2013.01); *G06F 3/067* (2013.01); *G06F 3/0665* (2013.01); *G06F 9/45558* (2013.01); *G06F 2009/45583* (2013.01)

(58) Field of Classification Search
CPC ...... G06F 3/0619; G06F 3/0665; G06F 3/067; G06F 9/45558
See application file for complete search history.

(56) References Cited

U.S. PATENT DOCUMENTS

2008/0031220 A1* 2/2008 Li .................. H04L 7/0054
370/350

* cited by examiner

*Primary Examiner* — Camquy Truong
(74) *Attorney, Agent, or Firm* — Campbell Stephenson LLP

(57) ABSTRACT

Disclosed herein are methods, systems, and processes for managing raw device mapping during disaster recovery. A raw device mapping (RDM) file operation is assigned to a virtual device associated with a virtual machine that is replicated from a premise site. A determination is made that a RDM file associated with the virtual device is invalid or is not replicated after the virtual machine is replicated to a target site. Based on the determination that the RDM file is invalid or is not replicated, the virtual device is removed from the virtual machine and the assigned RDM file operation is performed.

20 Claims, 9 Drawing Sheets

300

| RDM File Operations Table 305 | | | |
|---|---|---|---|
| RDM Mapping File Replication State Field 310 | World Wide Name Identifier (WWN ID) of Source LUN & Target LUN Field 315 | Mapping File Location Field 320 | Mapping File Operation Field 325 |
| RDM Mapping File not replicated to target site | Any | Any | CREATE |
| RDM Mapping File replicated to target site | Same WWN ID for source LUN & target LUN | Stored with virtual machine | NO-OP |
| | Same WWN ID for source LUN & target LUN | Not stored with virtual machine | REPLACE |
| | Different WWN ID for source LUN & target LUN | Any | REPLACE |

FIG. 3

MANAGING RAW DEVICE MAPPING DURING DISASTER RECOVERY

FIELD OF THE DISCLOSURE

This disclosure relates to computing operations associated with disaster recovery. In particular, this disclosure relates to managing raw device mapping during disaster recovery.

DESCRIPTION OF THE RELATED ART

Disaster recovery enables the recovery and/or continuation of vital technology infrastructure and computing systems that support critical enterprise functions. Because modern enterprises implement virtualized computing environments, managing disaster recovery operations (e.g., failback operations, reverse replication operations, and the like) in such virtualized computing environments poses unique challenges.

For example, certain hypervisors use a mechanism called Raw Device Mapping (RDM) that permits a physical device such as a shared storage device to be exposed directly to virtual machines or computing nodes executing on a given hypervisor (e.g., using device pass through). RDM allows a virtual machine to directly access and use the physical storage device and contains information (e.g., metadata) for managing and redirecting disk access to the physical device.

Typically, RDM is used in configurations involving an in-guest cluster within virtual machines, a cluster within physical machines and virtual machines, and/or for Storage Area Network (SAN)-aware application executing on a virtual machine. When a virtual machine or a physical machine with RDM is configured for disaster recovery, handling RDM during disaster recovery operations such as failover and failback for various storage and replication configurations poses significant technology-related challenges (e.g., preventing data corruption, among other issues).

SUMMARY OF THE DISCLOSURE

Disclosed herein are methods, systems, and processes for managing raw device mapping during disaster recovery. One such method involves assigning a raw device mapping (RDM) file operation to a virtual device associated with a virtual machine that is replicated from a premise site, determining that a RDM file associated with the virtual device is invalid or is not replicated after the virtual machine is replicated to a target site, and based on the determining that the RDM file is invalid or is not replicated, removing the virtual device from the virtual machine and performing the assigned RDM file operation.

In one embodiment, the assigned RDM file operation includes a create operation, a replace operation, or a no operation. In this example, determining that the RDM file is invalid includes determining that a source Logical Unit Number (LUN) and a target LUN associated with the virtual device have different World Wide Number Identifiers (WWN IDs), or determining that the RDM file is not stored with the virtual machine.

In another embodiment, determining that the RDM file is valid and can be utilized includes determining that the source LUN and the target LUN of the virtual device share a WWN ID, and determining that the RDM file is stored with the virtual machine.

In some embodiments, the method involves creating the virtual device on the target site, generating a new RDM file if the assigned RDM file operation is the create operation, replacing the RDM file with the new RDM file if the assigned RDM file operation is the replace operation, utilizing the RDM file if the assigned RDM file operation is the no operation, and attaching the virtual device to the virtual machine that is replicated from the premise site to the target site.

In other embodiments, the method involves determining that the RDM file is shared between the virtual machine and one or more virtual machines, assigning the create operation or the replace operation to a first virtual device, assigning the no operation to other virtual devices other than the first virtual device, and creating the first virtual device prior to creating the other virtual devices other than the first virtual device.

In certain embodiments, the method involves determining that the virtual machine is replicated from the premise site to the target site as part of a hypervisor-based replication process, and assigning the create operation to the virtual device (e.g., RDM virtual devices) associated with the virtual machine.

In certain other embodiments, the method involves receiving information indicating that the source LUN and the target LUN have different WWN IDs, that source LUN and the target LUN share the WWN ID, that the RDM file is not stored with the virtual machine, or that the RDM file is stored with the virtual machine, from a premise computing device executing on the premise site.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 3 is a table 300 of RDM file operations, according to one embodiment of the present disclosure.

Figure 1:
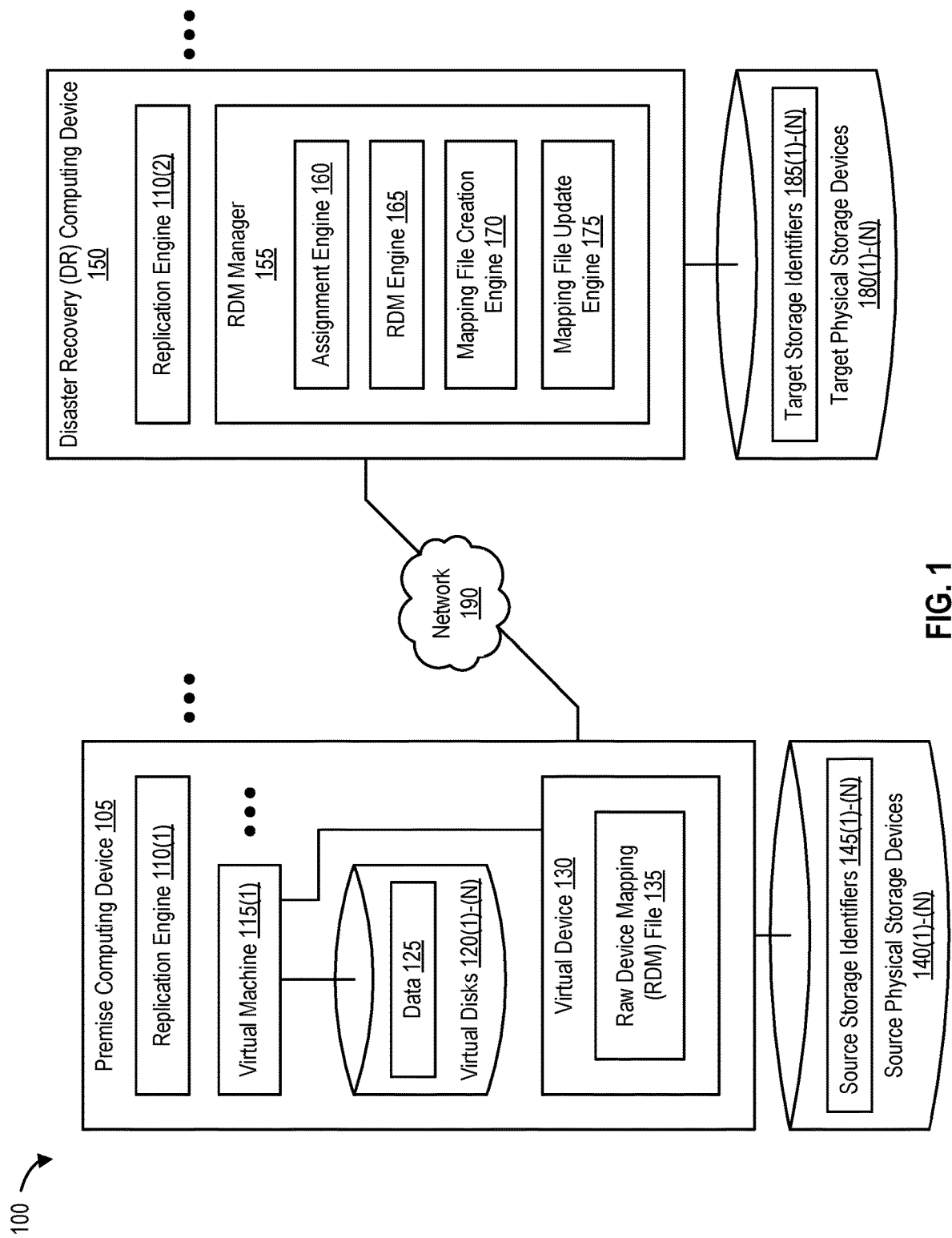
FIG. 1 is a block diagram 100 of a computing system for managing raw device mapping (RDM), according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Modern enterprise computing environments often include any number computing devices (e.g., virtual machines and/or physical machines implemented in a cluster). Configuring these clustered computing environments for disaster recovery (DR) typically involves ensuring that following a disaster or failure of some sort, some or all of the computing devices can be restarted a separate environment. Goals of DR include restarting the virtual machines in a timely manner and preventing data loss. A DR operation typically involves one or more of the following: shutting down computing devices in a primary site, bringing down computing assets (e.g., storage assets such as physical storage devices, and the like) associated with the computing devices, restarting the computing devices in a recovery site, and/or ensuring that the computing assets used by the computing devices are in place and properly configured to support computing devices. Configuring DR operations often involves many computing resources other than the computing device being protected. A DR operation (e.g., a failover operation, a migration operation, and the like) typically includes ordered processes by which these computing assets are taken offline at one site, known as a primary, or production site, and brought back online at another site, known as a recovery, or DR site.

Therefore, DR enables the recovery and/or continuation of vital technology infrastructure and computing systems that support critical enterprise functions. Because modern enterprises implement virtualized computing environments, efficiently configuring, coordinating, and/or managing DR operations (e.g., failback operations, reverse replication operations, and the like) in such virtualized computing environments poses unique challenges.

As previously noted, certain hypervisors use a mechanism called Raw Device Mapping (RDM) that permits a physical device such as a shared storage device to be exposed directly to virtual machines or computing nodes executing on a given hypervisor (e.g., using device pass through). RDM allows a virtual machine to directly access and use the physical storage device and contains information (e.g., metadata) for managing and redirecting disk access to the physical device.

RDM is typically implemented in storage and replication configurations involving an in-guest cluster within virtual machines or a cluster within physical and virtual machines, or for Storage Area Network (SAN)-aware applications executing inside a virtual machine. For example, such configurations can involve clustering between virtual machines or between physical machines and virtual machines, and physical machine to virtual machine conversion. When such a virtual machine or physical machine configured with RDM is implemented in a DR-based scenario, efficiently coordinating and/or handing RDM configurations, for example during failover to and failback from a DR site, takes on added importance, and as previously noted, presents unique technology-related challenges.

For instance, such storage and replication configurations can include, but are not limited to, RDM devices shared between multiple virtual machines, source and target Logical Unit Numbers (LUNs) with different World Wide Number Identifiers (WWN IDs) in a hardware replicated computing environment (resulting in invalid RDM paths), and/or RDM paths stored with a virtual machine or in an independent location (that may or may not be replicated to a DR site). In addition, in a multi-site replication environment (e.g., Synchronous Long Distance (SLD) configuration, Symmetrix Remote Data Facility (SRDF), and the like), two virtual machines can use independent RDM paths for two synchronously replicated devices at a source site, but the DR site can include a single LUN that requires configuration as a shared RDM device between the virtual machines.

Explicit handling of RDM configurations is required in such situations because if a mapping file (also referred to as an RDM mapping file) associated with a device (e.g., a virtual machine or a physical machine) is not replicated to a target or DR site, if the WWN ID of a backing LUN is different for source and target (physical) storage devices, or if the mapping file is not kept and/or maintained with the virtual machine (e.g., inside the virtual machine folder), the RDM virtual device will lose its backing configuration (causing data corruption, among other issues). Therefore, when a migration operation is performed, the foregoing factors and/or potential complications can cause the unavailability and/or corruption of the RDM mapping file, thus preventing the successful restarting and/or provisioning of the computing device (e.g., a virtual machine) on the DR site.

Existing technologies that support virtual and physical modes of RDM suffer from at least a few shortcomings. Such solutions do not replicate the mapping file of the RDM (e.g., the mapping file is typically created at a user-specified location on a target site with user-specified backing raw LUN), avoid the handling of various possible combinations of storage and replication configurations, do not support both array-level replication and hypervisor-based replication, and/or fail to consider non-replicated mapping files and other scenarios such as different WWN IDs, location of mapping files, shared RDMs, and other issues.

Disclosed herein are methods, systems, and processes for optimizing the configuration and handling of raw device mapping during disaster recovery while providing support for virtual and physical modes of RDM, shared RDMs, storage-level replication, and hypervisor-based replication.

Example Computing Systems for Handling Raw Device Mapping During DR

FIG. 1 is a block diagram 100 of a computing system for managing raw device mapping (RDM), according to one embodiment. Premise computing device 105 includes a replication engine 110(1) and at least one virtual machine 115(1). Replication engine 110(1) manages and performs disaster recovery-based computing operations such as a replication, failover, migration, and the like. Premise computing device 105 can implement more than one virtual machine. Virtual machine 115(1) is associated with virtual disks 120(1)-(N) (which store data 125) and a virtual device 130 (which is associated with a raw device mapping (RDM) file 135 that resides on a datastore). In this example, virtual device 130 is an RDM virtual device.

Premise computing device 105 is communicatively coupled to source physical storage devices 140(1)-(N), which include source storage identifiers 145(1)-(N). In this example, source storage identifiers are source LUNs associated with source physical storage devices 140(1)-(N) and RDM file 135 serves as a proxy for a raw physical device (e.g., source physical storage device 140(1)). RDM file 135 includes metadata for managing and redirecting disk access to one or more of source physical storage devices 140(1)-(N).

Disaster recovery (DR) computing device 150 includes replication engine 110(2) and an RDM manager 155. RDM manager 155 includes at least an assignment engine 160, an RDM engine 165, a mapping file creation engine 170, and a mapping file update engine 175. Replication engine 110(2) manages and performs disaster recovery-based computing operations such as a reverse replication, failback, and the like. DR computing device 150 is communicatively coupled to target physical storage devices 180(1)-(N) which include target storage identifiers 185(1)-(N) (e.g., target LUNs).

Premise computing device 105 and DR computing device 150 are communicatively coupled via network 190 and can be any of a variety of different computing devices (e.g., physical servers enabled for virtualization, or the like). Network 190 can be any type of network and/or interconnection (e.g., the Internet, a Wide Area Network (WAN), and the like). Source physical storage devices 140(1)-(N) and target physical storage devices 180(1)-(N) can include one or more of a variety of different storage devices, including hard disks, solid state drive (SSD) using "Flash" memory, and the like, or one or more logical storage devices such as volumes implemented on one or more such physical storage devices.

Figure 2:
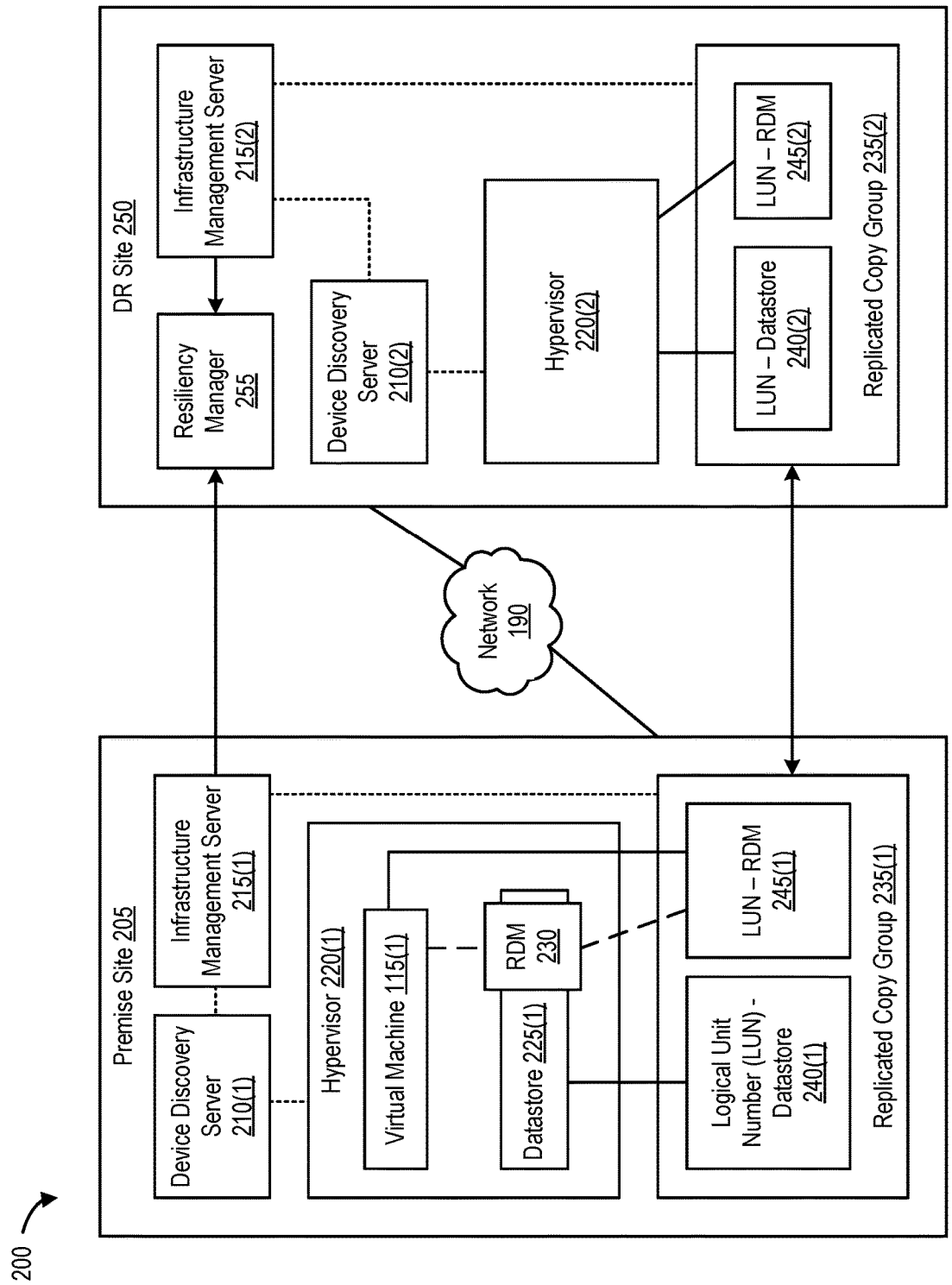
FIG. 2 is a block diagram 200 of a computing system for managing RDM during disaster recovery, according to one embodiment of the present disclosure.

FIG. 2 is a block diagram 200 of distributed computing systems for managing RDM during disaster recovery, according to one embodiment. Premise site 205 includes a device discovery server 210(1), an infrastructure management server 215(1), a hypervisor 220(1), and a replicated copy group 235(1). Hypervisor 220(1) implements virtual machine 115(1) and datastore 225(1), which is configured with RDM 230 (e.g., an RDM virtual device such as virtual device 130. Replicated copy group 235(1) (e.g., a 3PAR remote copy group, and the like) includes a LUN-datastore 240(1) and a LUN-RDM 245(1). In certain embodiments, RDM 230 enables LUN-RDM 245(1) to be directly connected to virtual machine 115(1) (e.g., from a SAN), is a (RDM) mapping file (e.g., RDM file 135) in a separate virtual machine file system (VMFS) volume that acts as a proxy for a raw physical device (e.g., source physical storage device 140(1)) used by virtual machine 115(1), and contains metadata for managing and redirecting disk access to the physical (storage) device (e.g., to optimize the performance of input/output (I/O) intensive applications).

Premise site 205 is communicatively coupled to a DR site 250 via network 190. DR site 250 includes a resiliency manager 255 for managing failover and failback operations, a device discovery server 210(2), an infrastructure management server 215(2), a hypervisor 220(2), and a replicated copy group 235(2). Replicated copy group 235(2) includes a LUN-datastore 240(2) and a LUN-RDM 245(2). Replicated copy groups 235(1) and 235(2) each refer to a logical group of replication units (e.g., LUNs) (with maintained data/operation consistency).

Device discovery server 210(1), in conjunction with infrastructure management server 215(1), performs device discovery and infrastructure management for premise site 205 and device discovery server 210(2), in conjunction with infrastructure management server 215(2), performs device discovery and infrastructure management for DR site 250 (e.g., determining the number of virtual and/or physical machines or physical storage devices in operation, whether device and/or storage sharing is enabled, mode of disks, and other information regarding computing devices and associated assets operating on premise site 205 and DR site 250, respectively, using one or more application programming interfaces (APIs)).

Examples of Designating RDM Mapping File Operations During DR

FIG. 3 is a table 300 of RDM file operations, according to one embodiment. RDM file operations table 305 is created and maintained by RDM manager 155 and includes an RDM mapping file replication state field 310, a WWN ID of source and target LUN field 315, a mapping file location field 320, and a mapping file operation field 325. In this example and according to certain embodiments, a Logical Unit Number (LUN) is a number used to identify a logical unit, which is a device addressed by the Small Computer System Interface (SCSI) protocol or SAN protocols which encapsulate SCSI (e.g., Fibre Channel or iSCSI), and a WWN ID is a World Wide Name (WWN) or World Wide Identifier (WWID) (e.g., a unique identifier used in storage technologies include Fibre Channel, Advanced Technology Attachment (ATA), or Serial Attached SCSI (SAS)). Device discovery servers 210(1) and 210(2) and infrastructure management servers 215(1) and 215(2) can discover and/or determine the LUNs and WWNs/WWIDs for premise site 205 and DR site 250, respectively.

In one embodiment, if RDM mapping file (e.g., RDM file 135) is not replicated to a target site (e.g., DR site 250), assignment engine 160 sets the mapping file operation to CREATE. In another embodiment, if the RDM mapping file is replicated to the target site, the source and target LUNs have the same WWN/WWID, and the mapping file is stored with the virtual machine (being replicated), assignment engine 160 sets the mapping file operation to NO-OP. In some embodiments, if the RDM mapping file is replicated to the target site and the source and target LUNs have the same WWN/WWID, but the mapping file is not stored with the virtual machine, assignment engine 160 sets the mapping file operation to REPLACE. In other embodiments, if the RDM mapping file is replicated to the target site but the source and target LUNs have different WWNs/WWIDs, assignment engine 160 sets the mapping file operation to REPLACE. In this manner, RDM manager 155 identifies and designates the mapping file operation for RDM virtual devices.

In a failover operation, a virtual machine is migrated from premise site 205 to DR site 250 (e.g., using third-party storage-level replication or hypervisor-based replication). The failover operation involves at least the following steps: virtual machine 115(1) gets powered off and unregistered from hypervisor 220(1), physical storage (e.g., source physical storage device 140(1)) gets unmounted at premise site 205, the replication direction is reversed, the physical storage is mounted at DR site 250, and virtual machine 115(1) is registered and powered on (on DR site 250). If a virtual machine with RDM (e.g., virtual machine 115(1)) gets registered at DR site 250 as part of a failover operation, the RDM virtual device (e.g., virtual device 130 or RDM 230) attached to virtual machine 115(1) loses its backing configuration if RDM file 135 is corrupted/invalid or is unavailable at DR site 250 after migration.

RDM file operations table 305 covers multiple scenarios where an RDM virtual device of a virtual machine loses its backing configuration and becomes invalid. In certain embodiments, RDM file 135 is not replicated to DR site 250. In this example, when virtual machine 115(1) gets registered on DR site 250 after replication, virtual machine 115(1) does not get the RDM mapping file for the RDM virtual device associated with virtual machine 115(1), and thus loses the backing configuration and becomes invalid.

In one embodiment, the WWN/WWID of the backing LUN for premise site 205 and DR site 250 is different. Thus, when the source mapping file (e.g., RDM file 135) gets replicated to DR site 250, the target LUN cannot be found because the WWN/WWID in the replicated mapping file is of the source LUN (and the target LUN's WWN/WWID is different). In this scenario, the mapping file is no longer correct or valid. In another embodiment, the RDM mapping file is not kept or maintained with virtual machine 115(1) (e.g., inside a virtual machine folder on datastore 225(1) along with the configuration file). In this example, upon migration, the RDM virtual device is rendered invalid.

In one embodiment, assignment engine 160 assigns a RDM file operation to virtual device 130 associated with virtual machine 115(1) that is replicated from premise site 205. In this example, RDM engine 165 determines that RDM file 135 associated with virtual device 130 is invalid or not replicated after virtual machine 115(1) is replicated to DR site 250. Based on determining that RDM file 135 is invalid or is not replicated, RDM engine 165 removes virtual device 130 from virtual machine 115(1), and mapping file creation engine 170 or mapping file update engine 175 performs the assigned RDM file operation.

In some embodiments, the assigned RDM file operation (e.g., assigned by assignment engine 160) includes a create operation (e.g., performed by mapping file creation engine 170), a replace operation (e.g., performed by mapping file update engine 175), or a no operation (e.g., no mapping file operation is performed or necessary, for example, if the mapping file is replicated, available, and valid). In these examples, determining that RDM file 135 is invalid includes determining that a source LUN (e.g., source storage identifier 145(1)) and a target LUN (e.g., target storage identifier 185(1)) associated with virtual device 130 have different WWNs/WWIDs or determining that RDM file 135 is not stored with virtual machine 115(1) (e.g., inside a virtual machine folder on datastore 225(1)). In other embodiments, determining that RDM file 135 is valid and can be utilized includes determining that the source LUN and the target LUN of virtual device 130 (e.g., RDM 230) share a WWN/WWID (e.g., the same WWN/WWID), and determining that RDM file 135 is stored with virtual machine 115(1) (e.g., in datastore 225(1)).

In certain embodiments, RDM engine 165 creates an RDM virtual device on DR site 250. Next, mapping file creation engine 170 generates a new RDM file if the RDM file operation assigned by assignment engine 160 is the create operation, mapping file update engine 175 replaces RDM file 135 with the new RDM file if the RDM operation assigned by assignment engine 160 is the replace operation, or RDM manager 155 utilizes RDM file 135 if the RDM operation assigned by assignment engine 160 is the no operation. Finally, RDM engine 165 attaches virtual device 130 (e.g., RDM 230) to virtual machine 115(1) that is replicated from premise site 205 to DR site 250.

In certain other embodiments, RDM manager 155 receives information indicating that the source LUN and the target LUN have different WWNs/WWIDs, that source LUN and the target LUN share the same WWN/WWID, that RDM file 135 is not stored with virtual machine 115(1), or that RDM file 135 is stored with virtual machine 115(1), from premise computing device 105 executing on premise site 205.

Example of Managing RDM for Shared RDMs & Hypervisor-Based Replication

In one embodiment, RDM manager 155 determines that RDM file 135 is shared between virtual machine 115(1) and one or more other virtual machines. In this example, assignment engine 160 assigns the create operation or the replace operation to a first virtual device, assigns the no operation to other virtual devices other than the first virtual device, and creates the first virtual device prior to creating the other virtual devices (upon replication of the underlying virtual machines).

In another embodiment, RDM manager 155 determines that virtual machine 115(1) is replicated from premise site 205 to DR site 250 as part of a hypervisor-based replication process. In this example, assignment engine 160 assigns the create operation to the virtual device associated with virtual machine 115(1) (e.g., virtual device 130) because the mapping file operations of RDM file operations table 305 do not apply as there is no array-side replication and the RDM mapping file can be created at a specific location for the RDM virtual devices.

Example Steps for Configuring RDM Virtual Devices at a DR Site

In certain embodiments, RDM manager 155 performs at least the following steps to configure RDM virtual devices at DR site 250. First, assignment engine 160 identifies and designates mapping file operations for RDM virtual devices (e.g., per RDM file operations table 305 as shown in FIG. 3, including the special configurations for shared RDM and hypervisor-based replication as described above). The following steps are then executed per RDM virtual device. Second, RDM engine 165 determines whether the RDM virtual device is already attached to a virtual machine with the correct configuration (if the RDM virtual device is attached to the virtual machine with the correct configuration, RDM engine 165 moves to the second/next RDM virtual device. Third, RDM engine 165 removes the RDM virtual device from the virtual machine (because the RDM virtual device is invalid). Fourth, RDM engine 165 creates the RDM virtual device with the correct configuration (e.g., RDM engine 165 uses data received from device discovery server 210(2) and/or infrastructure management server 215(2) such as target LUN WWN/WWID, mode of RDM (e.g., physical or virtual), location of mapping file on the datastore, and the like). This fourth step utilizes the mapping file operation designated or assigned in the first step. For example, if the mapping file operation is set to CREATE, mapping file creation engine 170 creates a new mapping file at a specified location, if the mapping file operation is set to REPLACE, mapping file update engine 175 deletes the older mapping file and creates a new mapping file, or if the mapping file operation is set to NO-OP, RDM manager 155 utilizes the existing (replicated) mapping file.

In certain other embodiments, virtual device 130 is a RDM virtual device file (e.g., a raw device mapping file). In these examples, RDM file 135 points to source storage identifiers 145(1)-(N), virtual device 130 is a logical unit associated with and/or attached to a virtual machine of type 'virtual disk' which contains the path of RDM file 135 (e.g., temp.vmdk), and RDM file 135 resides on a datastore which maintains metadata of the raw storage LUN on the array. Virtual device 130 can be a virtual disk (e.g., a file based disk or a raw LUN-based disk, an Ethernet adapter, a CD-ROM, and the like).

Example Processes for Managing RDM During DR

Figure 4:
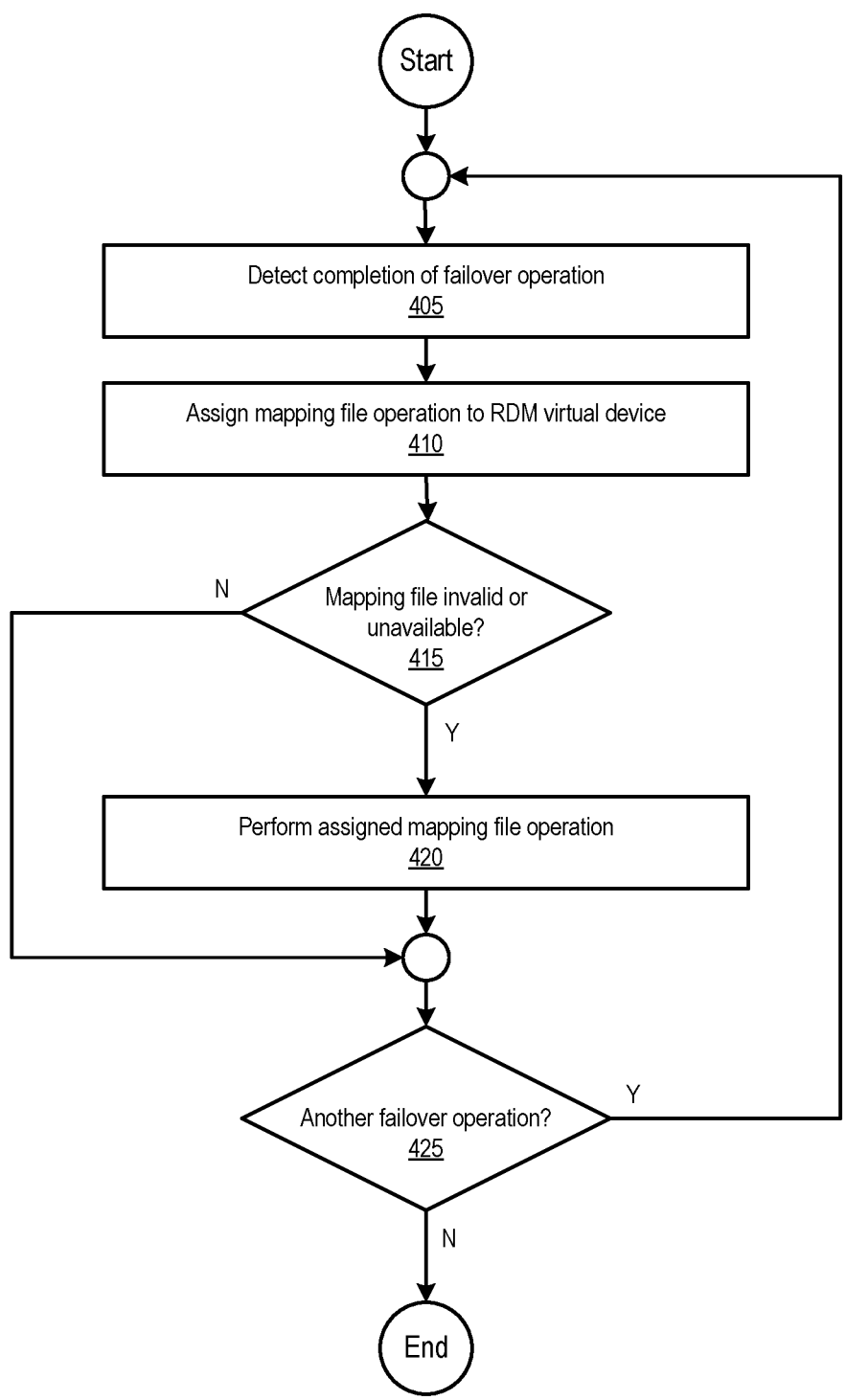
FIG. 4 is a flowchart 400 of a process for performing assigned mapping file operations, according to one embodiment of the present disclosure.

FIG. 4 is a flowchart 400 of a process for performing assigned mapping file operations, according to one embodiment. The process begins at 405 by detecting completion of a failover operation. At 410, the process assigns mapping file operations (e.g., as shown in FIG. 3) to a RDM virtual device (e.g., virtual device 130 or RDM 230). At 415, the process determines whether the mapping file (e.g., RDM file 135) is invalid or unavailable. If the mapping file not invalid and/or is available, the process loops to 425.

However, if the mapping file is invalid or unavailable, the process, at 420, performs the assigned or designate mapping file operation (e.g., per RDM file operations table 305 as shown in FIG. 3). At 425, the process determines whether there is another failover operation. If there is another failover operation, the process loops to 405. Otherwise, the process ends.

Figure 5:
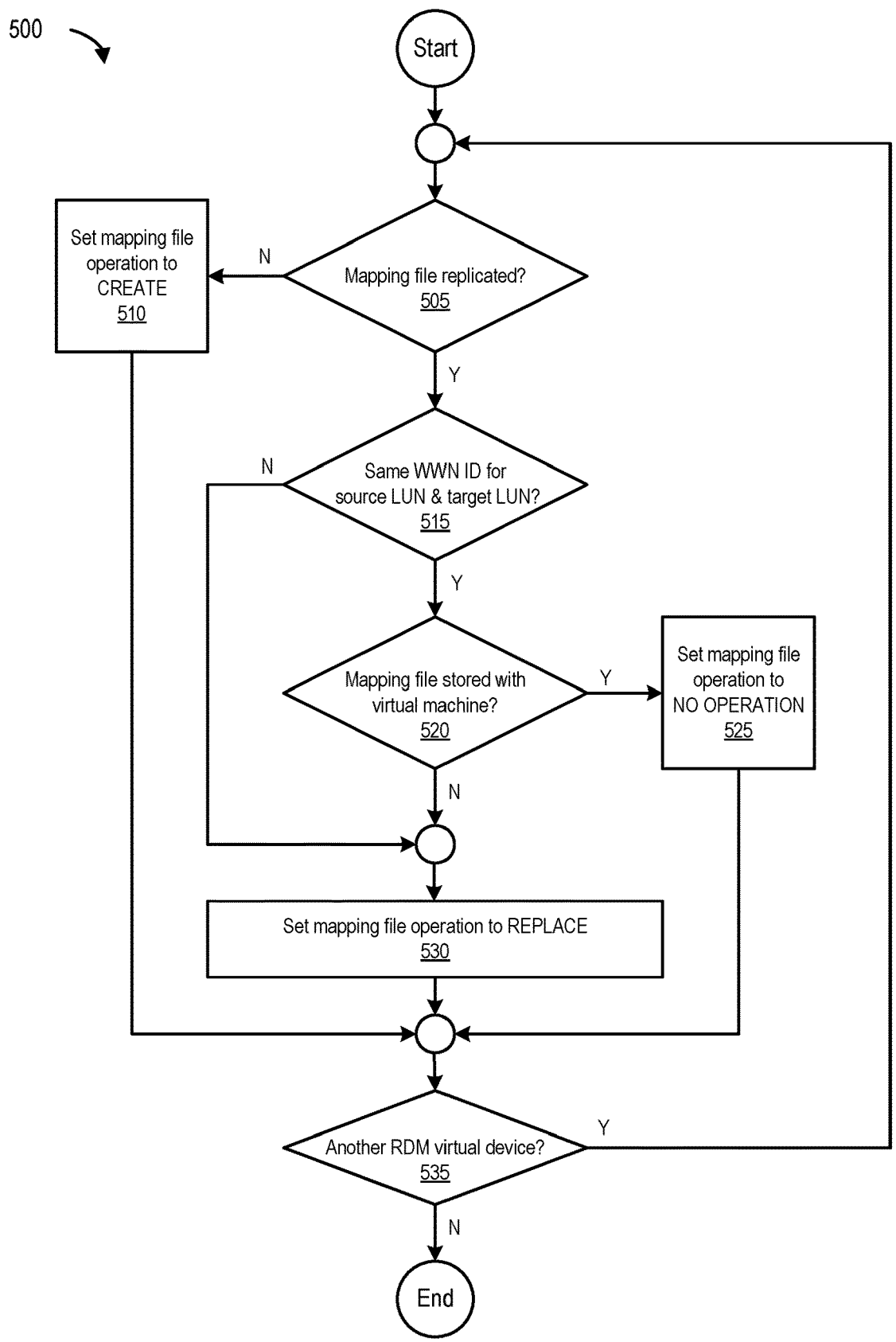
FIG. 5 is a flowchart 500 of a process for assigning mapping file operations, according to one embodiment of the present disclosure.

FIG. 5 is a flowchart 500 of a process for assigning mapping file operations, according to one embodiment. The process begins at 505 by determining if a mapping file has been replicated. If the mapping file has not been replicated, the process sets the mapping file operation to CREATE and loops to 535. If the mapping file has been replicated, the process, at 515, determines whether the source LUN and the target LUN have the same WWN/WWID. If the source LUN and the target LUN do not have the same WWN/WWID, the process loops to 530 and sets the mapping file operation to REPLACE.

However, if the source LUN and the target LUN have the same WWN/WWID, the process, at 520, determines whether the mapping file is stored with the virtual machine. If the mapping file is stored with the virtual machine, the process, at 525, sets the mapping file operation to NOP and loops to 535. However, if the mapping file is not stored with the virtual machine, the process, at 530, sets the mapping file operation to REPLACE. At 535, the process determines if there is another RDM virtual device. If there is another RDM virtual device, the process loops to 505. Otherwise, the process ends.

Figure 6:
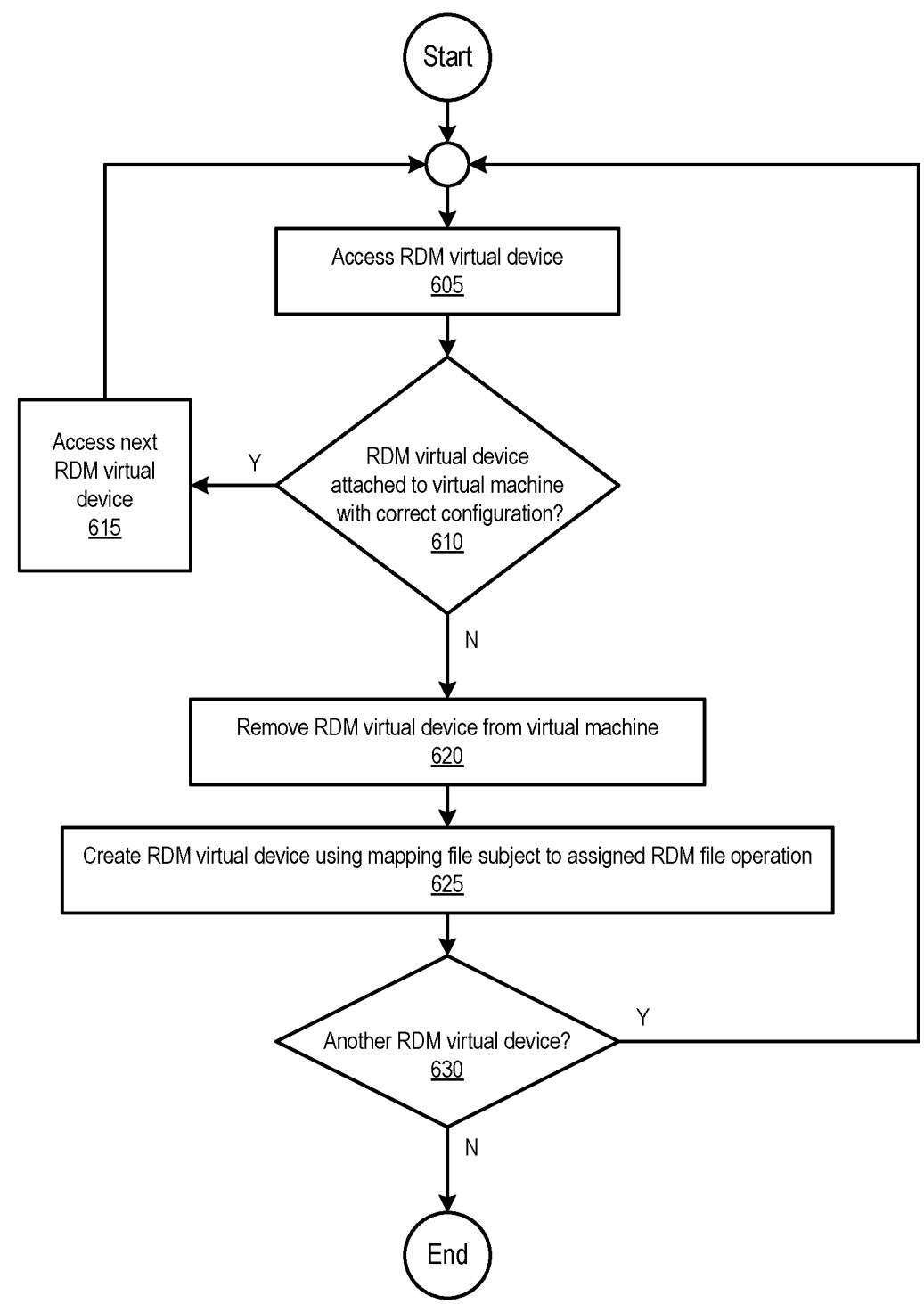
FIG. 6 is a flowchart 600 of a process for creating a RDM virtual device, according to one embodiment of the present disclosure.

FIG. 6 is a flowchart 600 of a process for creating a RDM virtual device, according to one embodiment. The process begins at 605 by accessing an RDM virtual device (e.g., virtual device 130). At 610, the process determines whether the RDM virtual device is attached to a virtual machine with the correct configuration. If the RDM virtual device is attached to the virtual machine with the correct configuration, the process, at 615, accesses the next RDM virtual machine and loops to 605. However, if the RDM virtual device is not attached to the virtual machine with the correct configuration, the process, at 620, removes the RDM virtual device from the virtual machine. At 625, the process creates the RDM virtual device using a mapping file subject to assigned or designated mapping file operations. At 630, the process determines if there is another RDM virtual device. If there is another RDM virtual device, the process loops to 605. Otherwise, the process ends.

Figure 7A:
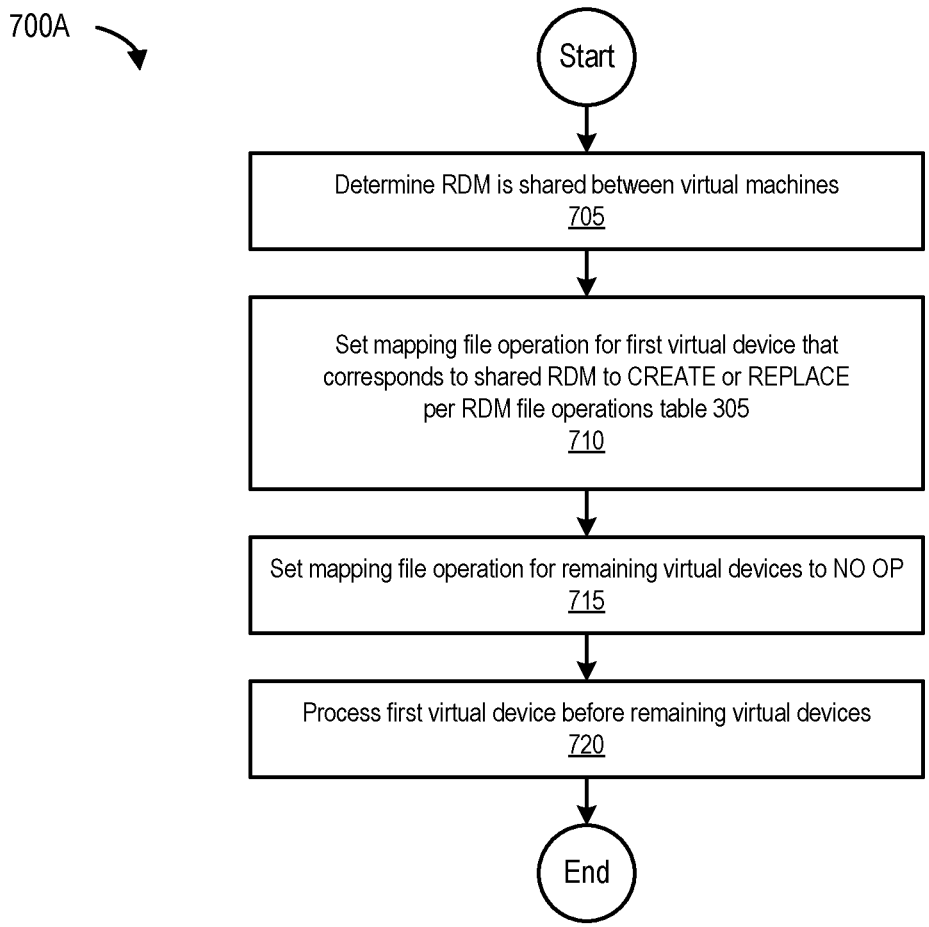
FIG. 7A is a flowchart 700A of a process for managing a shared RDM, according to one embodiment of the present disclosure.

FIG. 7A is a flowchart 700A of a process for managing a shared RDM, according to one embodiment. The process begins at 705 by determining that RDM is shared between virtual machines. At 710, the process sets, designates, or assigns the mapping file operation for the first virtual device that corresponds to the shared RDM to CREATE or REPLACE (e.g., per RDM file operations table 305 of FIG. 3). At 715, the process sets the mapping file operation for the remaining virtual devices to NO OP. For example, assignment engine 160 sets the NOP file operation for all virtual devices except for the first virtual device (which is set to CREATE or REPLACE). The process ends at 720 by processing the first virtual device before (processing) the remaining virtual devices.

Figure 7B:
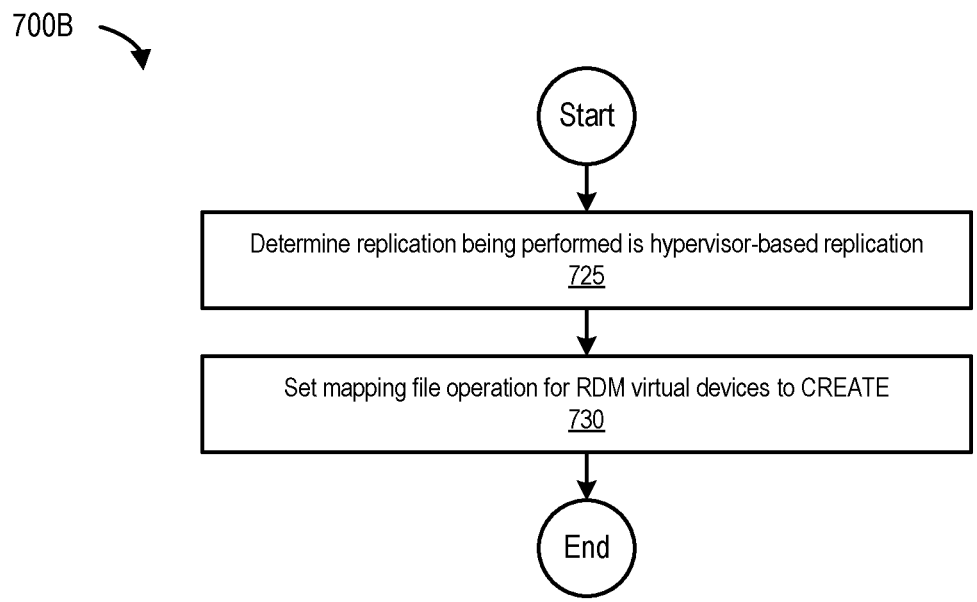
FIG. 7B is a flowchart 700B of a process for managing RDM for hypervisor-based replication, according to one embodiment of the present disclosure.

FIG. 7B is a flowchart 700B of a process for managing RDM for hypervisor-based replication, according to one embodiment. The process begins at 725 by determining that replication being performed is hypervisor-based replication. The process ends at 730 by setting mapping file operation for RDM virtual devices to CREATE.

The methods, systems, and processes described herein optimize the configuration and handling of raw device mapping during disaster recovery and provide support for virtual, physical, and shared modes of RDM, and storage-level and hypervisor-based replication.

Example Computing Environment

Figure 8:
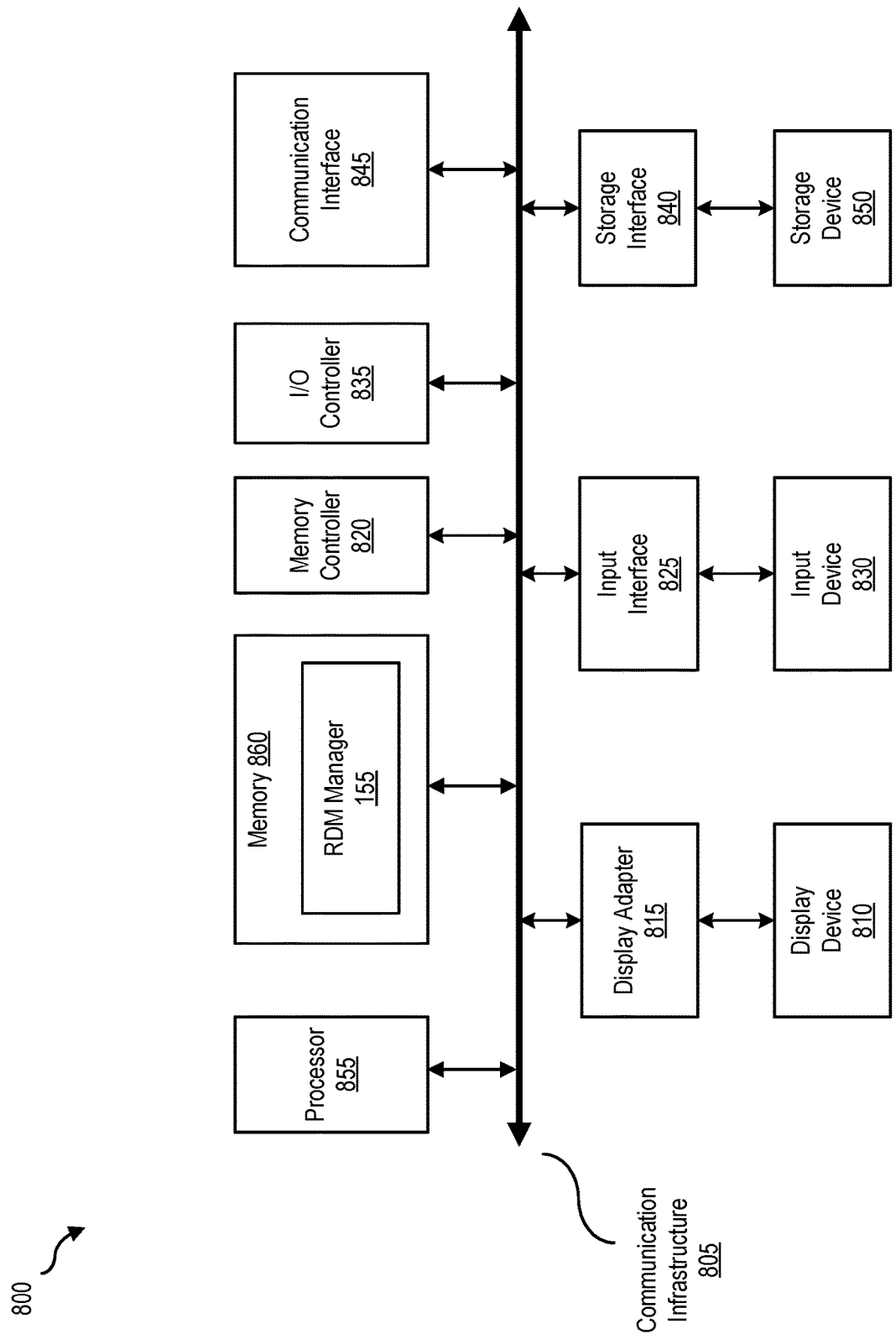
FIG. 8 is a block diagram 800 of a RDM management computing system, according to one embodiment of the present disclosure.

FIG. 8 is a block diagram of a computing system 800, according to one embodiment. Computing system 800 can include premise computing device 105 or DR computing device 150 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes RDM manager 155, computing system 800 becomes a special purpose computing device that is configured to optimize the handling of raw device mapping (RDM) operations in disaster recovery computing environments.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing RDM manager 155 and/or resiliency manager 255 may be loaded into memory 860.

Computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtual machine and/or a physical computing device. I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815 (e.g., in a GUI). Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in storage device 850. When executed by processor 855, a computer program loaded into computing system 800 may cause processor 855 to perform and/or be a means for performing the functions of one or more of the embodiments described herein. Alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
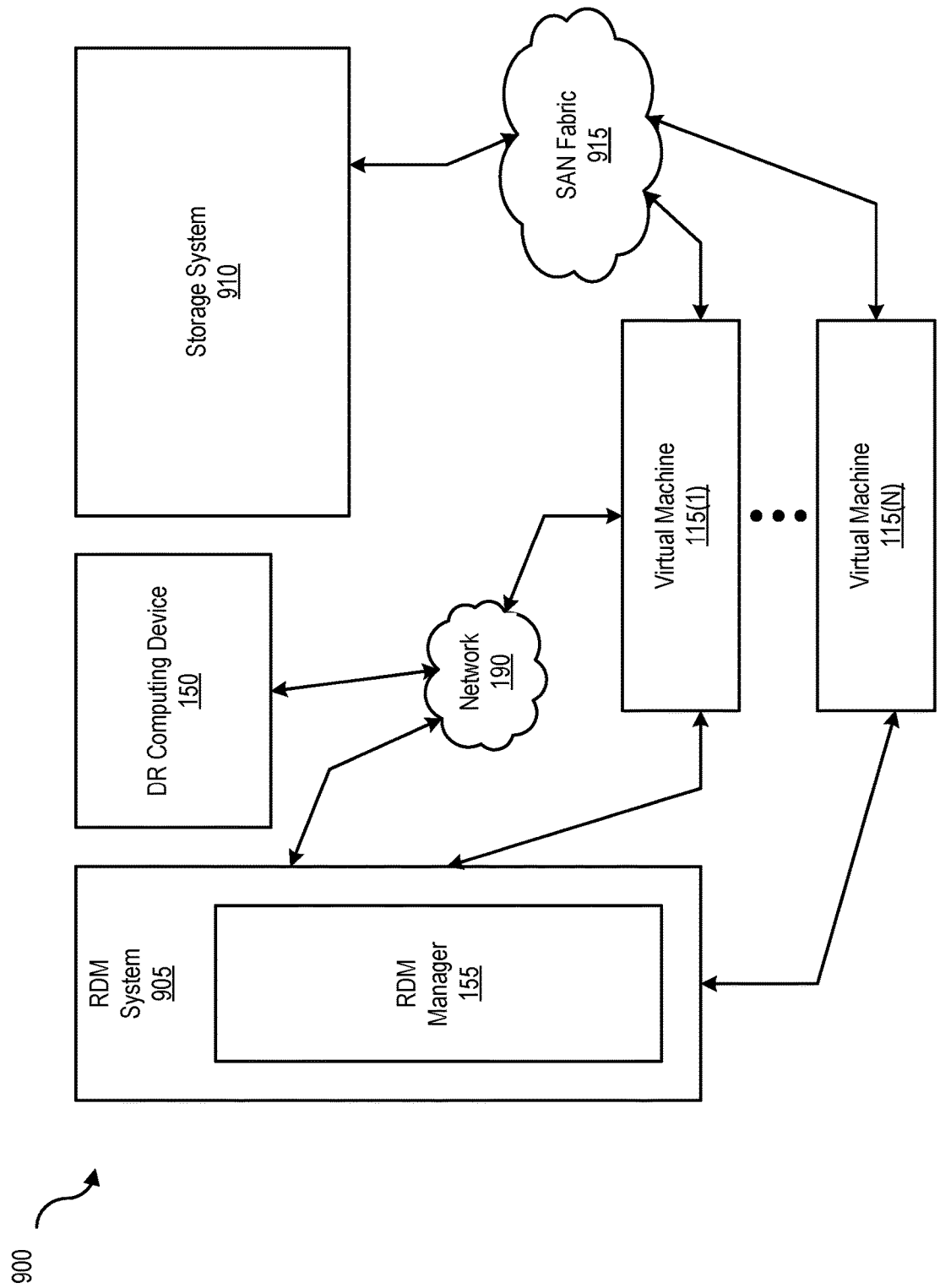
FIG. 9 is a block diagram 900 of a networked system, according to one embodiment of the present disclosure.

FIG. 9 is a block diagram of a networked system, illustrating how various computing devices can communicate via a network, according to one embodiment. In certain embodiments, network-attached storage (NAS) devices may be configured to communicate with premise computing device 105, DR computing device 150, and/or RDM system 905 using Network File System (NFS), Server Message Block (SMB), or Common Internet File System (CIFS). Network 190 generally represents any type or form of computer network or architecture capable of facilitating communication between premise computing device 105, DR computing device 150, and/or RDM system 905.

In certain embodiments, a communication interface, such as communication interface 845 in FIG. 8, may be used to provide connectivity between premise computing device 105, DR computing device 150, and/or RDM system 905, and network 190. The embodiments described and/or illustrated herein are not limited to the Internet or any particular network-based environment. In some embodiments, network 190 can be a Storage Area Network (SAN). In other embodiments, RDM manager 155 may be part of DR computing device 150, or may be separate. If separate, RDM manager 155 may be implemented in RDM system 905, which may be communicatively coupled to DR computing device 150 via a network (e.g., a LAN).

In one embodiment, all or a portion of one or more of the disclosed embodiments may be encoded as a computer program and loaded onto and executed by DR computing device 150. All or a portion of one or more of the embodiments disclosed herein may also be encoded as a computer program, stored on storage system 910, and distributed over network 190.

In some examples, all or a portion of DR computing device 150 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, RDM manager 155 may transform the behavior of DR computing device 150 to optimize the management of RDM during disaster recovery.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising
   assigning a raw device mapping (RDM) file operation to a virtual device, wherein
      the virtual device is associated with a virtual machine, and
      the virtual machine is replicated from a premise site;
   determining that a RDM file associated with the virtual device is invalid or is not replicated after the virtual machine is replicated to a target site; and
   based on the determining that the RDM file is invalid or is not replicated,
      removing the virtual device from the virtual machine, and
      performing the assigned RDM file operation.

2. The computer-implemented method of claim 1, wherein the assigned RDM file operation comprises
   a create operation,
   a replace operation, or
   a no operation.

3. The computer-implemented method of claim 2, wherein determining that the RDM file is invalid comprises
   determining that a source Logical Unit Number (LUN) and a target LUN associated with the virtual device have different World Wide Number Identifiers (WWN IDs), or
   determining that the RDM file is not stored with the virtual machine.

4. The computer-implemented method of claim 3, wherein determining that the RDM file is valid and can be utilized comprises
   determining that the source LUN and the target LUN of the virtual device share a WWN ID, and
   determining that the RDM file is stored with the virtual machine.

5. The computer-implemented method of claim 2, further comprising:
   creating the virtual device on the target site;
   generating a new RDM file if the assigned RDM file operation is the create operation;
   replacing the RDM file with the new RDM file if the assigned RDM file operation is the replace operation;
   utilizing the RDM file if the assigned RDM file operation is the no operation; and
   attaching the virtual device to the virtual machine that is replicated from the premise site to the target site.

6. The computer-implemented method of claim 2, further comprising:
   determining that the RDM file is shared between the virtual machine and one or more virtual machines;
   assigning the create operation or the replace operation to a first virtual device of a plurality of virtual devices;
   assigning the no operation to the plurality of virtual devices other than the first virtual device; and
   creating the first virtual device prior to creating the plurality of virtual devices other than the first virtual device.

7. The computer-implemented method of claim 2, further comprising:

determining that the virtual machine is replicated from the premise site to the target site as part of a hypervisor-based replication process; and
assigning the create operation to the virtual device associated with the virtual machine.

8. The computer-implemented method of claim 2, further comprising:
receiving information indicating that the source LUN and the target LUN have different WWN IDs, that source LUN and the target LUN share the WWN ID, that the RDM file is not stored with the virtual machine, or that the RDM file is stored with the virtual machine, from a premise computing device executing on the premise site.

9. A non-transitory computer readable storage medium comprising program instructions executable to:
assign a raw device mapping (RDM) file operation to a virtual device, wherein
the virtual device is associated with a virtual machine, and
the virtual machine is replicated from a premise site;
determine that a RDM file associated with the virtual device is invalid or is not replicated after the virtual machine is replicated to a target site; and
based on a determination that the RDM file is invalid or is not replicated,
remove the virtual device from the virtual machine, and
perform the assigned RDM file operation.

10. The non-transitory computer readable storage medium of claim 9, wherein the assigned RDM file operation comprises
a create operation,
a replace operation, or
a no operation.

11. The non-transitory computer readable storage medium of claim 10, wherein the program instructions executable to determine that the RDM file is invalid comprise further program instructions executable to
determine that a source Logical Unit Number (LUN) and a target LUN associated with the virtual device have different World Wide Number Identifiers (WWN IDs), or
determine that the RDM file is not stored with the virtual machine, or the program instructions executable to determine that the RDM file is valid and can be utilized comprise further program instructions executable to
determine that the source LUN and the target LUN of the virtual device share a WWN ID, and
determine that the RDM file is stored with the virtual machine.

12. The non-transitory computer readable storage medium of claim 10, further comprising further program instructions executable to:
create the virtual device on the target site;
generate a new RDM file if the assigned RDM file operation is the create operation;
replace the RDM file with the new RDM file if the assigned RDM file operation is the replace operation;
utilize the RDM file if the assigned RDM file operation is the no operation; and
attach the virtual device to the virtual machine that is replicated from the premise site to the target site.

13. The non-transitory computer readable storage medium of claim 10, further comprising further program instructions executable to:
determine that the RDM file is shared between the virtual machine and one or more virtual machines;
assign the create operation or the replace operation to a first virtual device of a plurality of virtual devices;
assign the no operation to the plurality of virtual devices other than the first virtual device; and
create the first virtual device prior to creating the plurality of virtual devices other than the first virtual device.

14. The non-transitory computer readable storage medium of claim 10, further comprising further program instructions executable to:
determine that the virtual machine is replicated from the premise site to the target site as part of a hypervisor-based replication process; and
assign the create operation to the virtual device associated with the virtual machine.

15. A system comprising:
one or more processors; and
a memory coupled to the one or more processors, wherein the memory stores program instructions executable by the one or more processors to
assign a raw device mapping (RDM) file operation to a virtual device, wherein
the virtual device is associated with a virtual machine, and
the virtual machine is replicated from a premise site;
determine that a RDM file associated with the virtual device is invalid or is not replicated after the virtual machine is replicated to a target site; and
based on a determination that the RDM file is invalid or is not replicated,
remove the virtual device from the virtual machine, and
perform the assigned RDM file operation.

16. The system of claim 15, wherein the assigned RDM file operation comprises
a create operation,
a replace operation, or
a no operation.

17. The system of claim 16, wherein the program instructions executable by the one or more processors to determine that the RDM file is invalid comprise further program instructions executable by the one or more processors to
determine that a source Logical Unit Number (LUN) and a target LUN associated with the virtual device have different World Wide Number Identifiers (WWN IDs), or
determine that the RDM file is not stored with the virtual machine, or the program instructions executable by the one or more processors to determine that the RDM file is valid and can be utilized comprise further program instructions executable by the one or more processors to
determine that the source LUN and the target LUN of the virtual device share a WWN ID, and
determine that the RDM file is stored with the virtual machine.

18. The system of claim 16, further comprising further program instructions executable by the one or more processors to:
create the virtual device on the target site;
generate a new RDM file if the assigned RDM file operation is the create operation;
replace the RDM file with the new RDM file if the assigned RDM file operation is the replace operation;
utilize the RDM file if the assigned RDM file operation is the no operation; and
attach the virtual device to the virtual machine that is replicated from the premise site to the target site.

19. The system of claim 16, further comprising further program instructions executable by the one or more processors to:
- determine that the RDM file is shared between the virtual machine and one or more virtual machines;
- assign the create operation or the replace operation to a first virtual device of a plurality of virtual devices;
- assign the no operation to the plurality of virtual devices other than the first virtual device; and
- create the first virtual device prior to creating the plurality of virtual devices other than the first virtual device.

20. The system of claim 16, further comprising further program instructions executable by the one or more processors to:
- determine that the virtual machine is replicated from the premise site to the target site as part of a hypervisor-based replication process; and
- assign the create operation to the virtual device associated with the virtual machine.

* * * * *